US012068543B2

(12) United States Patent
Kadichevitz et al.

(10) Patent No.: US 12,068,543 B2
(45) Date of Patent: Aug. 20, 2024

(54) BEAM DIVERSITY BY SMART ANTENNA WITHOUT PASSIVE ELEMENTS

(71) Applicant: HUAWEI TECHNOLOGIES CO., LTD., Guangdong (CN)

(72) Inventors: Michael Kadichevitz, Hod Hasharon (IL); Doron Ezri, Hod Hasharon (IL); Avi Weitzman, Hod Hasharon (IL); Xiao Zhou, Shanghai (CN); Yi Chen, Chengdu (CN); Xin Luo, Chengdu (CN); Yuping Shu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 17/696,986

(22) Filed: Mar. 17, 2022

(65) Prior Publication Data

US 2022/0209422 A1 Jun. 30, 2022

Related U.S. Application Data

(63) Continuation of application No. PCT/EP2019/075030, filed on Sep. 18, 2019.

(51) Int. Cl.
*H01Q 3/24* (2006.01)
*H01Q 1/00* (2006.01)
(Continued)

(52) U.S. Cl.
CPC ............... *H01Q 3/24* (2013.01); *H01Q 1/007* (2013.01); *H01Q 1/2291* (2013.01);
(Continued)

(58) Field of Classification Search
CPC ...... H01Q 1/007; H01Q 1/2291; H01Q 1/246; H01Q 1/36; H01Q 1/38; H01Q 3/01;
(Continued)

(56) References Cited

U.S. PATENT DOCUMENTS 5,235,343 A 8/1993 Audren et al.
7,123,205 B2 10/2006 Ratajczak et al.
(Continued)

FOREIGN PATENT DOCUMENTS

CN 1362755 A 8/2002
CN 103346392 A 10/2013
(Continued)

OTHER PUBLICATIONS

Dong Jia-wei et al, A Radiation Pattern Reconngurable Printed Dipole Antenna Designed for the Same Frequency, Microwave Journal Aug. 2010, with the English Abstract, 5 pages.
(Continued)

*Primary Examiner* — Robert Karacsony
(74) *Attorney, Agent, or Firm* — WOMBLE BOND DICKINSON (US) LLP

(57) ABSTRACT

An antenna device includes a plurality of dipole antennas and a port. Each of the dipole antennas is connected to the port. The plurality of dipole antennas is arranged around the port. Each of the plurality of dipole antennas includes two ends. The ends of the dipole antennas are arranged in a plurality of pairs. Each pair includes one end of one of the dipole antennas and one end of another one of the dipole antennas. The two ends in each pair are arranged in proximity to each other. One or more switches are configured to switch between (1) an omnidirectional state, in which the ends of the dipole antennas are not connected to each other; and (2) a directional state, in which the two ends in each of one or more of the pairs are connected to each other.

19 Claims, 13 Drawing Sheets

(51) Int. Cl.

| | |
|---|---|
| ***H01Q 1/22*** | (2006.01) |
| ***H01Q 9/06*** | (2006.01) |
| ***H01Q 21/20*** | (2006.01) |
| ***H01Q 21/24*** | (2006.01) |
| ***H01Q 21/28*** | (2006.01) |

(52) U.S. Cl.
CPC ........... *H01Q 9/065* (2013.01); *H01Q 21/205* (2013.01); *H01Q 21/24* (2013.01); *H01Q 21/28* (2013.01)

(58) Field of Classification Search
CPC .......... H01Q 3/24; H01Q 3/242; H01Q 3/247; H01Q 5/40; H01Q 5/42; H01Q 5/48; H01Q 5/49; H01Q 9/065; H01Q 9/28; H01Q 9/285; H01Q 21/20; H01Q 21/205; H01Q 21/24; H01Q 21/28; H01Q 21/29; H01Q 21/293; H01Q 21/296; H01Q 21/30; H01Q 23/00; H01Q 25/005
See application file for complete search history.

(56) References Cited

U.S. PATENT DOCUMENTS

| | | | |
|---|---|---|---|
| 7,511,680 | B2 | 3/2009 | Shtrom et al. |
| 7,675,474 | B2 | 3/2010 | Shtrom et al. |
| 7,696,946 | B2 | 4/2010 | Shtrom |
| 7,880,683 | B2 | 2/2011 | Shtrom et al. |
| 8,031,129 | B2 | 10/2011 | Shtrom et al. |
| 10,181,655 | B2 | 1/2019 | Shtrom et al. |
| 2004/0257292 | A1 | 12/2004 | Wang |
| 2006/0038735 | A1 | 2/2006 | Shtrom et al. |
| 2015/0288064 | A1 | 10/2015 | Su et al. |
| 2015/0349418 | A1 | 12/2015 | Patron et al. |

FOREIGN PATENT DOCUMENTS

| | | | |
|---|---|---|---|
| CN | 103390795 | A | 11/2013 |
| CN | 108092007 | A | 5/2018 |
| CN | 109066073 | A | 12/2018 |
| CN | 109119745 | A | 1/2019 |
| KR | 101798628 | B1 | 11/2017 |
| WO | 2011058378 | A1 | 5/2011 |

OTHER PUBLICATIONS

Meraline Selvaraj et al, Pattern Reconfigurable Antenna for Wireless Applications using Parasitic Ring, This fUll-text paper was peer-reviewed and accepted to be presented at the IEEE WiSPNET 2016 conference, 4 pages.

Gao Min et al: “A New Pattern Reconfigurable Loop Antennawith Wide Beam Width”,2018 Cross Strait Quad Regional Radio Science Andw Eless Technology Conference (CSQRWC), IEEE, Jul. 21, 2018 (Jul. 21, 2018) pp. 1 3, XP033398528,DOI:10.1109/CSQRWC.2018.8455728[retrieved on Sep. 5, 2018].

Danh H Nguyen et al: “Enabling synchronous directionalchannel access on SDRs for spectrum sharing applications”,W Eless Network Testbeds, Experimentalevaluation, and Characterization, ACM, 2 Pennplaza, Suite 701 New York NY 10121-0701 USA, Oct. 3, 2016 (Oct. 3, 2016), pp. 57-64, XP058280193,DOI: 10.1145/2980159.2980166ISBN: 978-1-4503-4252-0.

| Region | 40 | 42 | 44 | 46 |
|---|---|---|---|---|
| E Field (V/m) | 100-1,000 | 1,000-2,000 | 2,000 – 3,700 | 3,700 – 5,000 |

| Region | 52 | 54 | 56 | 58 |
|---|---|---|---|---|
| dB (Realized Gain in Total) | 4.3790 | 1.4546 to 4.3790 | -7.3185 to 1.4546 | -16.092 to -7.3185 |

| Region | 40 | 42 | 44 | 46 |
|---|---|---|---|---|
| E Field (V/m) | 100-1,000 | 1,000-2,000 | 2,000 – 3,700 | 3,700 – 5,000 |

| Region | 64 | 66 | 68 | 70 | 72 | 74 | 76 |
|---|---|---|---|---|---|---|---|
| dB (Realized Gain in Total) | 4.9722 to 7.768 | 2.1761 to 4.9722 | -.62012 to 2.1761 | -3.4163 to -.62012 | -9.0087 to -6.2125 | -17.397 to -9.0087 | -20.193 to -17.397 |

BEAM DIVERSITY BY SMART ANTENNA WITHOUT PASSIVE ELEMENTS

CROSS-REFERENCE TO RELATED APPLICATIONS

This application is a continuation of International Application No. PCT/EP2019/075030, filed on Sep. 18, 2019, the disclosure of which is hereby incorporated by reference in its entirety.

BACKGROUND

This application is related to PCT Application entitled "Beam Diversity by Smart Antenna With Passive Elements,", by the same inventors as the present application, filed on herewith date, the contents of which are incorporated by reference as if fully set forth herein.

The present disclosure, in some embodiments thereof, relates to an antenna device, and, more specifically, but not exclusively, to an antenna device that may be used with a Wi-Fi access point.

Wi-Fi is a wireless LAN standard, based on the IEEE standard 802.11, which is widely used in home, offices and other indoor/outdoor environments. Wi-Fi operates in 2 frequency bands, 2.4 GHz band and 5 GHz band, and manages the communication between an Access point and clients (computers, smart handset, various devices, etc.). The Wi-Fi protocol was developed to provide service to numerous users at arbitrary locations of the Access point's coverage area. In other words, the Access point needs to cover the entire area of its operation. For that reason, a Wi-Fi antenna typically has an omnidirectional beam for wide coverage.

The ultimate goal of any Wi-Fi system is to provide the highest possible throughput for each user. This goal requires a strong signal, to enable a good Signal to Interference and Noise Ratio (SINR). This goal also requires, when necessary, a narrow, directional beam, which may be directed with high gain in the direction of a particular user, while reducing the interference to other cells. Thus, an ideal Wi-Fi access point should be able to alternately emit an omnidirectional beam and to emit a narrow, directional beam.

Various solutions for alternating or diversifying beam coverage in Wi-Fi antennas may be used. One such solution is based on the use of reflectors and directors. The principle of operation of such prior art Wi-Fi antennas is based on the Yagi-Uda antenna. A Yagi-Uda antenna is a directional antenna consisting of multiple parallel elements in a line, usually half-wave dipoles made of metal rods. Yagi-Uda antennas consist of a single driven element connected to the transmitter or receiver with a transmission line, and additional parasitic elements which are not connected to the transmitter or receiver: a reflector and one or more directors. The reflector and director absorb and re-radiate the radio waves from the driven element with a different phase, modifying the dipole's radiation pattern. The waves from the multiple elements superpose and interfere to enhance radiation in a single direction, achieving a very substantial directional increase in the antenna's gain.

The Yagi-Uda concept has been applied for antenna elements of Wi-Fi Access points, to enable the Access point to emit different signal patterns. For example, a Wi-Fi access point may consist of a structure with one active element having two vertical bi-conical dipoles at the center of the structure, and a very large number of passive elements arranged in several circular arrays of different radiuses around it. Each passive element is made of several very short metal sections (e.g., shorter than ⅕ of a wavelength) which may be either shorted by diodes to one long passive element (around 0.5 wavelength) or left open. Shorting the passive elements thus changes them from directors to a reflector, and thereby changes the directional gain of the Wi-Fi access points. In another example, various passive elements may be arranged in series, with diodes configured therebetween. When the diodes are off, the passive elements act as directors. When the diodes are on, the length of the passive part is enlarged, and it acts as a reflector.

Another model for modifying the transmission of Wi-Fi access points involves selectively activating one of a plurality of radiating dipoles, each of which is attached to a ground component. The selection of the active dipole or dipoles may be done by operating series switches, e.g., diodes, on the feeding line of each dipole near its input. The radiating dipoles are of different sizes or configurations. Each dipole may be chosen depending on the type or characteristics of the signal that is desired.

Another model for diversifying the signal at Wi-Fi access points involves integrating both horizontally and vertically polarized elements within a single Wi-Fi access point. This model does not alter any signal characteristics, but rather integrates various signals into a single Access point.

SUMMARY

The foregoing models for modifying the signals in Wi-Fi antennas all rely on the inclusion of additional elements in the antenna system. For example, reliance on the Yagi-Uda principle requires inclusion of passive devices to serve as directors and reflectors. Similarly, selection from a plurality of radiating dipoles requires inclusion of additional radiating dipoles. In addition, use of both horizontally and vertically polarized elements adds one or more radiating dipole into the access point, and is not useful for a standard Wi-Fi access point, in which there is a single antenna that is horizontally or vertically polarized.

In addition, the above-described models, with their various additional passive elements, active dipoles, and/or antennas with multiple polarizations, require an access point with a comparatively larger area or footprint. The excess space is a particularly important consideration for enterprise-grade Wi-Fi access points. An enterprise-grade Wi-Fi access point supports two or three bands, with 8 or 16 antennas for 5 GHz, and an additional four antennas for 2.4 GHz. The additional elements required for each of the antennas would thus greatly enlarge the size requirements of the antenna device.

Accordingly, there is a need for a smart antenna device that provides the ability to alternate radiating beams between omnidirectional coverage and directional beam coverage. There is additionally a need for a smart antenna device that can respond to dynamic changes in the operational environment, in order to select properly when to utilize the omnidirectional beam coverage or the directional beam coverage. In addition, there is a need for a smart antenna device that incorporates an antenna which occupies a minimum of space.

It is therefore an object of the present disclosure to provide a smart antenna device with the ability to alternate radiating beams between omnidirectional coverage and directional beam coverage pointing to a specific sector within a coverage area. It is a further object of the present disclosure to provide such a smart antenna device that does not rely on inclusion of additional passive elements, as directors and reflectors.

The foregoing and other objects are achieved by the features of the independent claims. Further implementation forms are apparent from the dependent claims, the description and the figures.

According to a first aspect, an antenna device includes a plurality of dipole antennas and a port. Each of the dipole antennas is connected to the port, and the plurality of dipole antennas are arranged around the port. Each of the plurality of dipole antennas includes two ends. The ends of the dipole antennas are arranged in a plurality of pairs. Each pair includes one end of one of the dipole antennas and one end of another one of the dipole antennas. The two ends in each pair are arranged in proximity to each other. One or more switches are configured to switch between (1) an omnidirectional state, in which the ends of the dipole antennas are not connected to each other; and (2) a directional state, in which the two ends in each of one or more of the pairs are connected to each other.

An advantage of this aspect is that the antenna device may be switched between omnidirectional mode and directional mode without using any passive devices. Rather, the the mode switching operation is based on coupling of multiple dipole antennas to each other. In the omnidirectional state, when the dipole antennas are not connected to each other, the antenna device provides a high gain pattern in the azimuthal plane. The antenna device is also convertible to a high gain directional pattern in the azimuthal plane, when two ends in each of one or more of the pairs are connected to each other.

In an implementation of the antenna device according to the first aspect, in the directional state, at least two dipole antennas are combined into a single long radiating element having two feeding points. Advantageously, the at least two combined dipole antennas thus function as a single long radiating element antenna, thereby increasing the directional gain without requiring use of any passive elements.

In another possible implementation of the antenna device according to the first aspect, each of the plurality of dipole antennas includes two asymmetric arms. The use of asymmetric arms causes the excitation of each dipole antenna to be asymmetric. This, in turn, enables using the same feeding network to match the antenna output, for both the omnidirectional state and the directional state.

In another possible implementation of the antenna device according to the first aspect, the plurality of dipole antennas are arranged around the port in a substantially rectangular or substantially circular orientation. Advantageously, these exemplary orientations are well suited for providing an omnidirectional signal.

In another possible implementation of the antenna device according to the first aspect, the plurality of dipole antennas are arranged horizontally above a ground plane. The ground plane may serve as a reflecting surface for the antenna waves of the dipole antennas, to increase the gain of the antenna device, in both the omnidirectional and directional states.

In another possible implementation of the antenna device according to the first aspect, the plurality of dipole antennas includes at least three dipole antennas. A minimum of three dipole antennas is necessary in order to distinguish between the omnidirectional state, when none of the antennas are connected to each other, and the directional state, when at least two of the antennas are connected to each other and at least one is not connected.

In another possible embodiment of the antenna device according to the first aspect, the gain in the entire azimuth plane is at least 4 dBi. This gain in the azimuth plane enables the antenna to be used to transmit a Wi-Fi signal to a suitably large area.

In another possible implementation of the antenna device according to the first aspect, the difference in gain between the omnidirectional state and the directional state is at least 3 dB. Advantageously, the difference in gain in the desired direction in the directional state, as compared to the gain in that direction in the omnidirectional state, is suitably significant.

In another possible implementation of the antenna device according to the first aspect, the antenna device further includes electronic circuitry for connecting and disconnecting ends of adjacent dipole antennas, and a control algorithm for determining which ends of adjacent dipole antennas to connect in order to steer an antenna beam of the antenna device in a directional state towards a location of one or more mobile devices. In this implementation, the antenna device is thus part of a smart antenna that may be toggled back and forth between the omnidirectional and directional states according to the needs of the environment, e.g., the location of mobile devices within a given range of the antenna device.

In another possible implementation of the antenna device according to the first aspect, the one or more switches include at least one of a diode, a transistor, and an electronic switch. These switches may be integrated with the control algorithm for toggling the smart antenna between the omnidirectional and directional states.

In a second aspect of the disclosure, a method for switching an antenna device from an omnidirectional state to a directional state is disclosed. The antenna device includes a plurality of dipole antennas and a port. Each of the dipole antennas is connected to the port. The plurality of dipole antennas are arranged around the port. Each of the plurality of dipole antennas includes two ends, and the ends of the dipole antennas are arranged in a plurality of pairs, each pair comprising one end of one of the dipole antennas and one end of another one of the dipole antennas. The two ends in each pair are arranged in proximity to each other. The antenna device further includes a switch configured to switch between (1) an omnidirectional state, in which the ends of the dipole antennas are not connected to each other; and (2) a directional state, in which the two ends in each of one or more of the pairs are connected to each other. The method includes operating the at least one switch to connect two ends in each of one or more of the pairs, and thereby switching the antenna device from the omnidirectional state to the directional state.

An advantage of this aspect is that the method may be used to switch an antenna device between the omnidirectional state and directional state without using any passive devices. Rather, the antenna device is switched between the states based on coupling of multiple dipole antennas to each other. This switching operation thus enables providing a high gain omnidirectional pattern in the azimuthal plane, when the dipole antennas are not connected to each other. The antenna device may also be converted to a high gain directional pattern in the azimuthal plane, when two ends in each of one or more of the pairs are connected to each other.

In an implementation of the method according to the second aspect, the method includes connecting at least a pair of adjacent dipole antennas into a single long radiating element having two feeding points. Advantageously, in the directional state, the at least two combined dipole antennas thus function as a single dipole antenna, which increases the directional gain without requiring use of any passive elements.

In an implementation of the method according to the second aspect, the method further includes increasing the gain between the omnidirectional state and the directional state in at least one direction by at least 3 dB. Advantageously, the difference in gain in the desired direction in the directional state, as compared to the gain in that direction in the omnidirectional state, is suitably significant.

In an implementation of the method according to the second aspect, the method further includes determining which direction to steer an antenna beam of the antenna device towards a location of one or more mobile devices. In this implementation, the antenna device is part of a smart antenna that may be toggled back and forth between the omnidirectional and directional states according to the needs of the environment, e.g., the location of mobile devices within a given range of the antenna device.

In a further implementation of the method according to the second aspect, the method further includes determining when to revert the antenna device back to the omnidirectional state, and operating the one or more switches, and thereby switching the antenna device back from the directional state to the omnidirectional state. In this implementation, the antenna device is part of a smart antenna that may be toggled back and forth between the omnidirectional and directional states according to the needs of the environment, e.g., the location of mobile devices within a given range of the antenna device.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
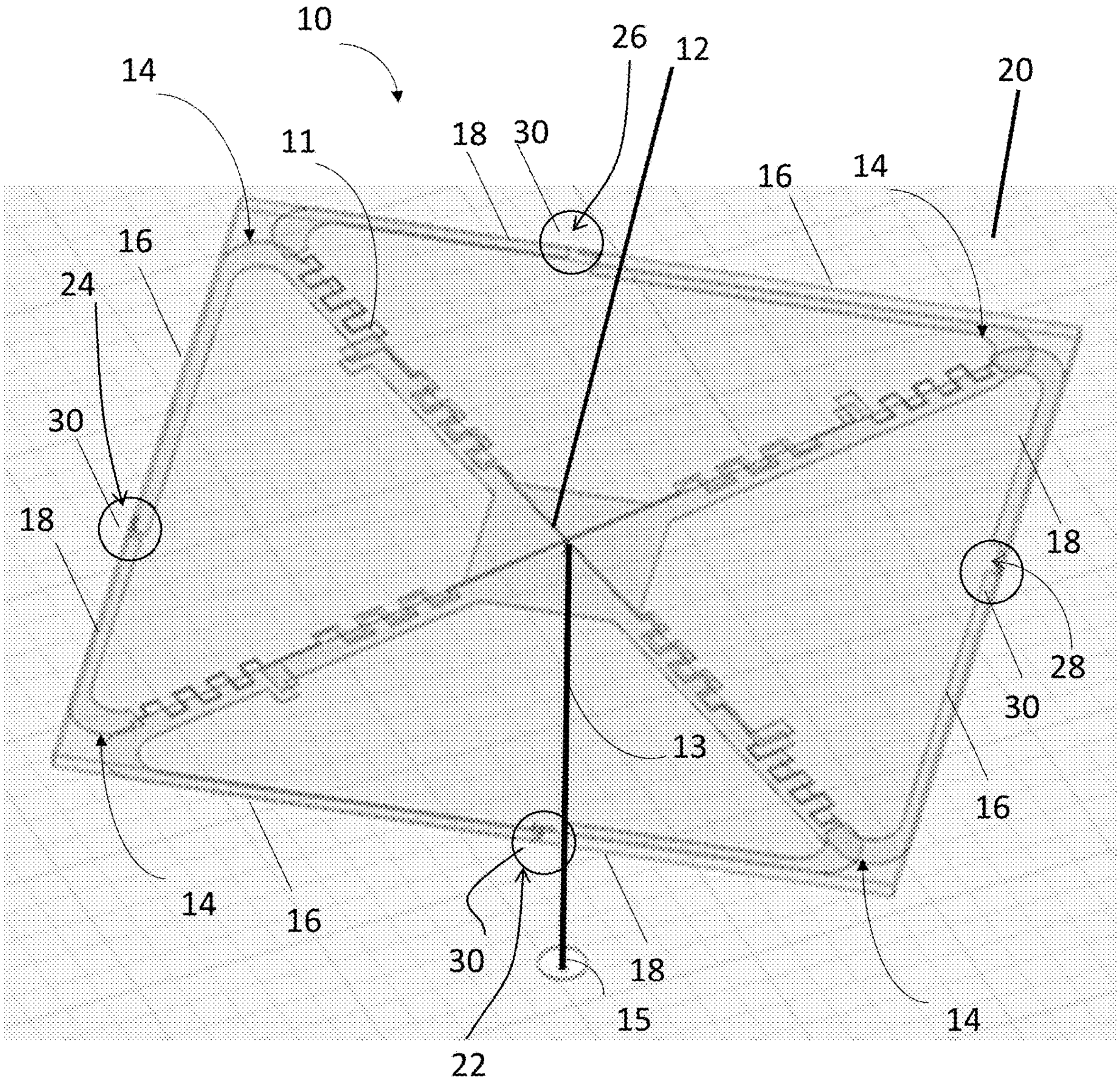
FIG. 1 is a depiction of an antenna device in an omnidirectional state, according to some embodiments of the disclosure.

The present disclosure, in some embodiments thereof, relates to an antenna device, and, more specifically, but not exclusively, to an antenna device that may be used with a Wi-Fi access point.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring to FIG. 1, antenna device 10 includes a plurality of dipole antennas 14, each electrically connected to port 12. The port 12 is electrically connected via conducting wire 13 to power source 15. The plurality of dipole antennas 14 may be arranged on an FR4 substrate, or on any other suitable substrate, such as a printed circuit board. The plurality of dipole antennas are arranged horizontally above a ground plane 20. Ground plane 20 is a flat or nearly flat horizontal conducting surface extending underneath the dipole antennas 14. For purposes of clarity, ground plane 20 may extend further outwards in all directions, and may have any suitable dimension. The ground plane may serve as a reflecting surface for the antenna waves of the dipole antennas 14, to increase the gain of the antenna device 10.

In the illustrated embodiment, there are four dipole antennas 14. The choice of four dipole antennas 14 is merely exemplary, and there may be fewer or more dipole antennas 14. In a preferred embodiment, there are at least three dipole antennas 14. Each dipole antenna 14 is configured asymmetrically, with a feeding arm 11 connecting to the port 12, a shorter arm 16 and a longer arm 18. The ratio of the lengths of the shorter arm 16 compared to the longer arm 18 may be 0.4:0.6. The sum of the lengths of the shorter arm 16 and longer arm 18 may be half of a wavelength of the transmitted signal. Thus, for example, when the transmitted signal is 2.45 GHz (the midpoint of the 2.4 GHz transmission band, which ranges between 2.4 and 2.5 GHz), the wavelength of the transmitted signal is 122.45 mm in free space and about 70 mm in the FR4 substrate, and the cumulative length of arms 16, 18 is about 35 mm. The Feeding arm 11 may be approximately 25 mm long.

The dipole antennas 14 are configured around the port 12 in a closed shape. In the illustrated embodiment, the closed shape is a rectangle; however, the closed shape may also be a circle, or any other polygon. The ends of arms 16, 18 are either one above the other or in the same plane almost touching each other. The dipole antennas 14 thus define junction points 22, 24, 26, and 28, respectively at each of the interfaces between arm 16 of one dipole antenna 14, and arm 18 of a second dipole antenna 14.

A switch 30 is configured at each of the junction points 22, 24, 26, 28. The switch 30 includes electronic circuitry for connecting and disconnecting ends of adjacent dipole antennas 14. This electronic circuitry may be, for example, a diode, a transistor, and/or an electronic switch. The switch 30 is switchable between an "on" position, in which the electronic circuitry forms a closed, or shorted, circuit between the adjacent arms 16, 18, and an "off" position, in which the arms 16, 18 remain unconnected. In the embodiment of FIG. 1, each switch 30 is depicted as an open circle, indicating that it is in the "off" position. Switch 30 may be connected to a remote processor (not shown) with a control algorithm for determining whether to operate switch 30 at each of the junction points 22, 24, 26, 28. The remote processor and control algorithm may be used to toggle the antenna device 10 back and forth between the omnidirectional state and a directional state, as will be discussed further herein.

In the embodiment of FIG. 1, because each switch 30 is in the "off" position, the antenna device 10 has an identical configuration throughout the entire circumference of antenna device 10. For this reason, antenna device 10 generates an omnidirectional electric field, as will be discussed in connection with FIGS. 2-4, and is said to be in an omnidirectional state.

Figure 2:
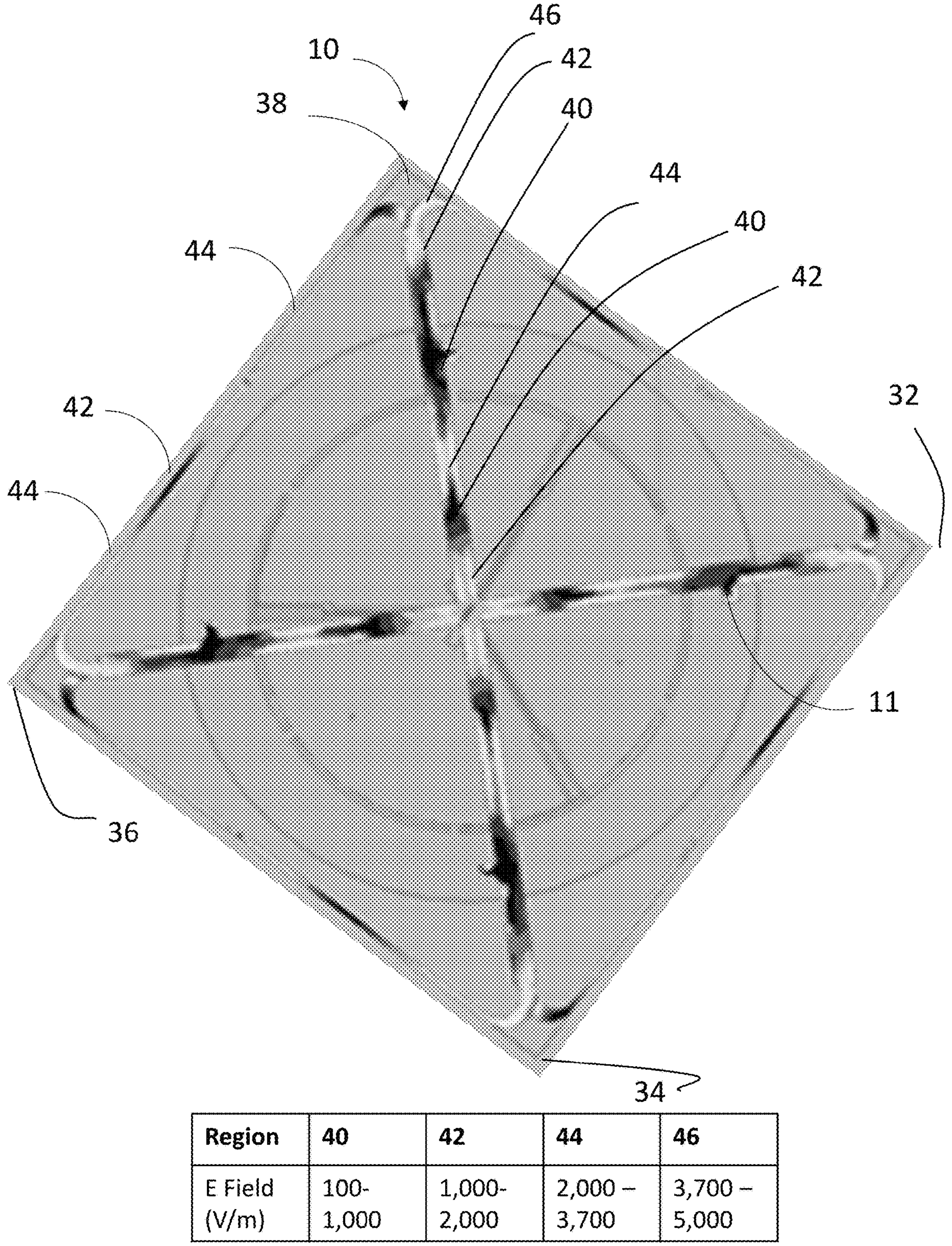
FIG. 2 is a depiction of the near electric field generated by the antenna device of FIG. 1 in the omnidirectional state, according to some embodiments of the disclosure.

FIG. 2 depicts an electric field that is generated along each dipole antenna 14, when the antenna device 10 is in the omnidirectional state. The strength of the electric field is measured in Volts per meter (V/m). For purposes of illustration, the strength of the electric field is divided into four regions. It is to be recognized that the variations in electric field across antenna device 10 are continuous, rather than discrete, and the following approximations of electric field for each particular region are for purposes of general explanation only. In region 40, which represents the darkest region, the electric field is between 100 and 1000 V/m. In region 42, both near the port 12 and near each of the corners 32, 34, 36, 38, the electric field is between 1,000 and 2,000 V/m. In region 44, both at feeding arm 11 and at arms 16 and 18, the electric field is between 2,000 and 3,700 V/m. Finally, at a small part of dipoles 14 near corners 32, 34, 36, 38, the electric field increases to a maximum of 5,000 V/m.

Figure 3:
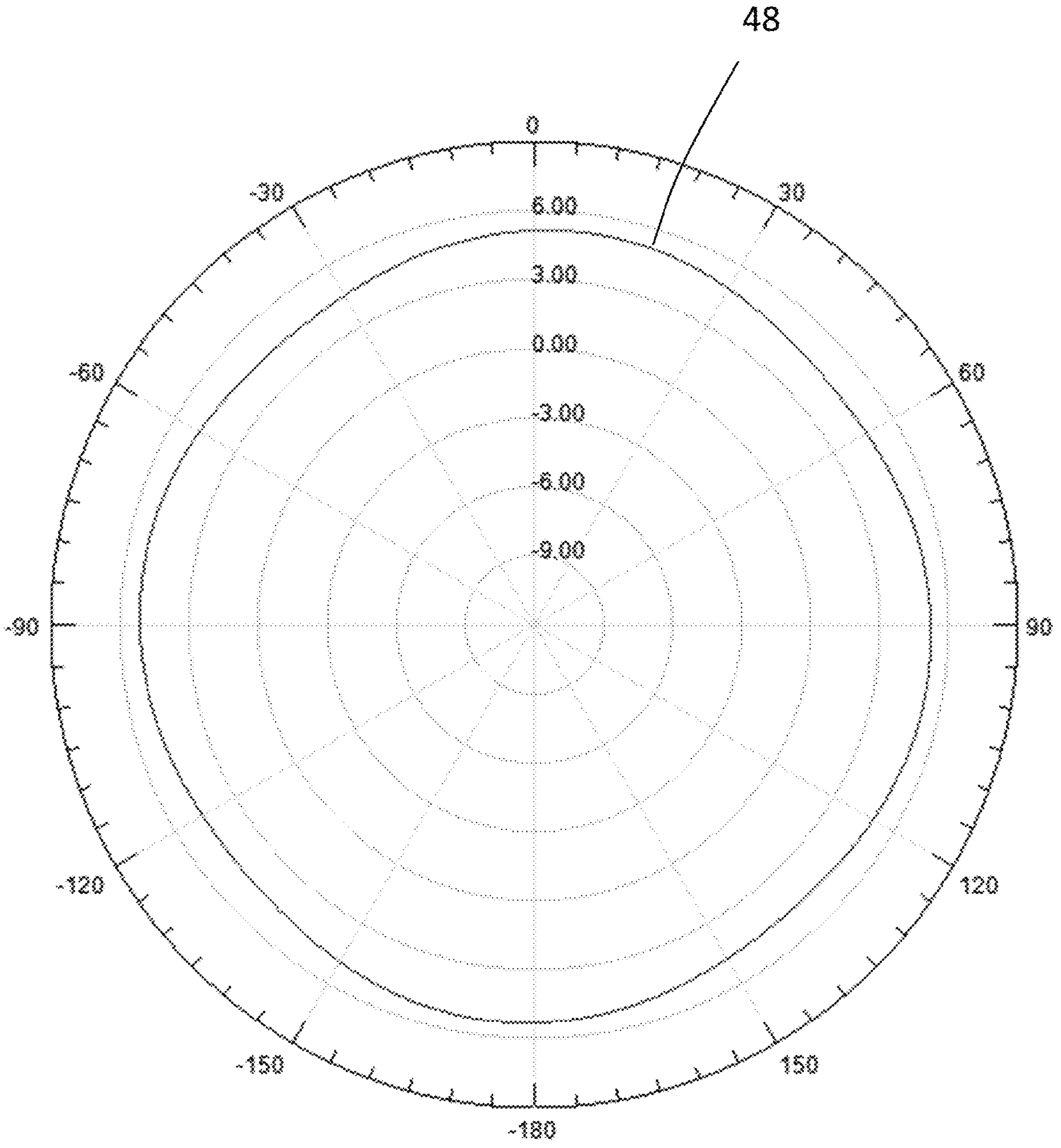
FIG. 3 is a depiction of the far electric field generated by the antenna device of FIG. 1 in the omnidirectional state, taken in the azimuthal plane at θ=135°, according to some embodiments of the disclosure.

FIG. 3 depicts the far electric field generated by antenna device 10 in the omnidirectional state. Far electric field 48 is measured in dBi as the azimuthal plane pattern, at frequency of 2.45 GHz, with theta at 135°. As can be seen, far electric field 48 is measured at more than 4 dBi, and nearly 6 dBi, throughout the circumference of the azimuthal plane. The reason that the far electric field 48 has an omnidirectional profile is because the near electric field shown in FIG. 2 has circular symmetry. As a result, far field 48 has a low ripple omnidirectional pattern.

Figure 4A:
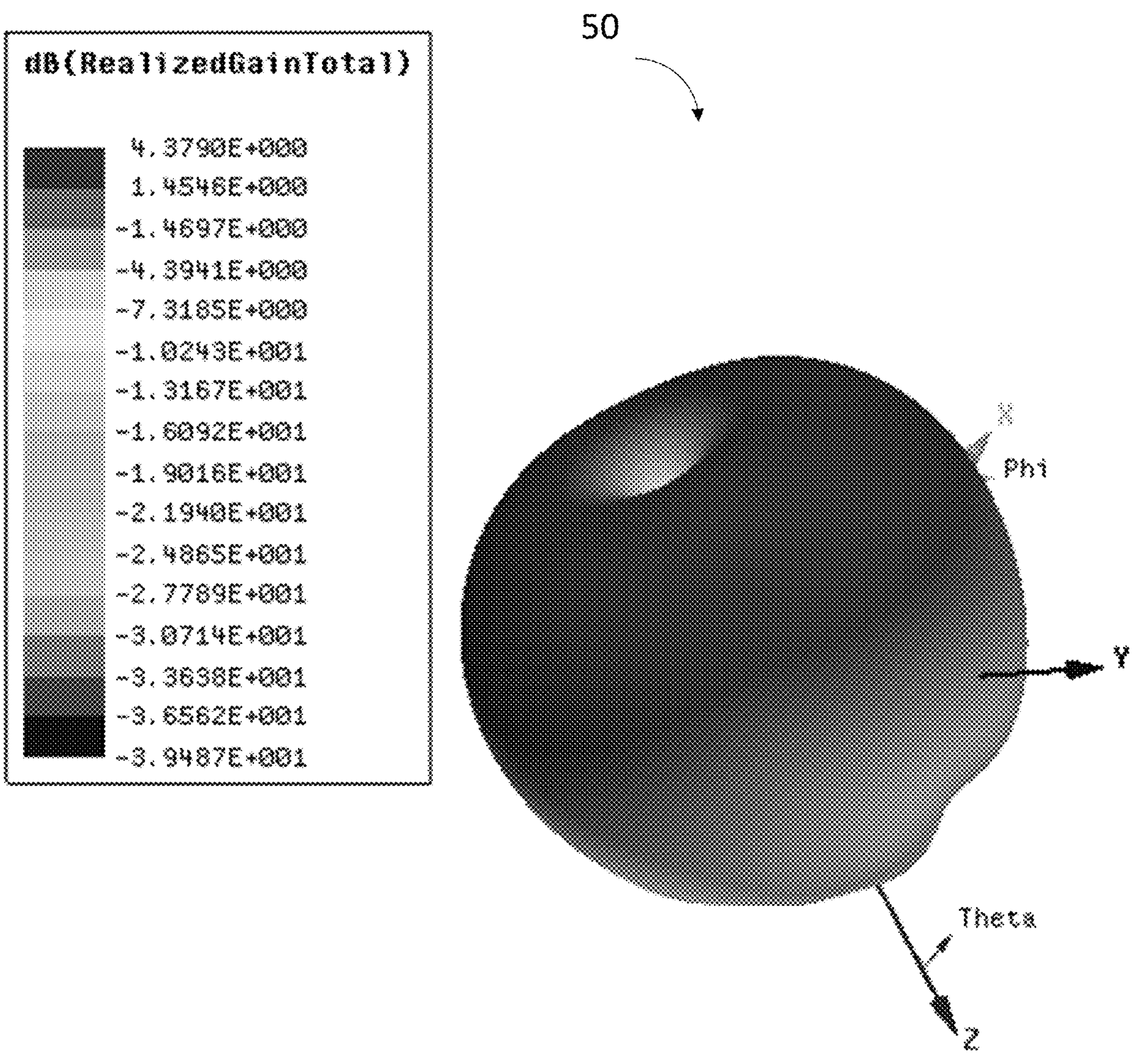
FIGS. 4A and 4B are depictions of the realized gain in total of the antenna device of FIG. 1, measured spherically around the antenna device, according to some embodiments of the disclosure.
Figure 4B:
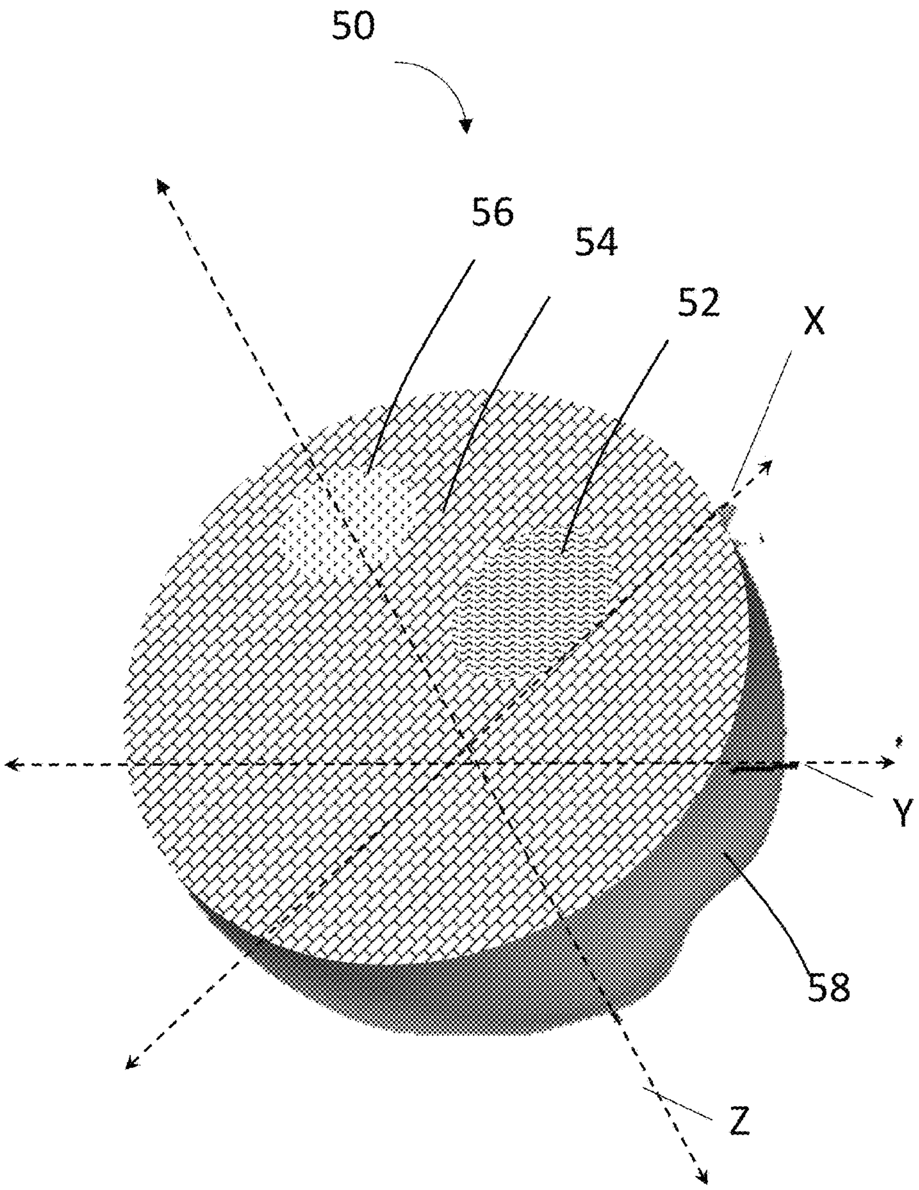

FIGS. 4A and 4B depict the gain 50 generated by the antenna device in the omnidirectional state. FIG. 4A illustrates the shape of the gain 50 profile in three dimensions, and FIG. 4B depicts the values of the gain 50 for various regions in the 3 dimensional profile, expressed in dBi. As can be seen in FIGS. 4A and 4B, in the omnidirectional state, the gain 50 can be measured along an approximately spherical plot. In addition, as seen best in FIG. 4A, the gain is approximately equivalent at each point along the azimuthal plane (i.e., a cross section taken along the X-Y planes). As seen in FIG. 4B, the realized gain in region 52 is 4.3790 dBi; in region 54, which is the largest region, the realized gain is between 1.4546 and 4.3790 dBi; in region 56, which is limited to a small portion along the Z-axis, the realized gain is between −7.3185 to 1.4546 dBi, and in the solid-colored region 58, the realized gain is between −16.092 to −7.3185 dBi. The differences in gain across the 3-dimensional profile are continuous, rather than discrete, and the regions 52, 54, 56, and 58 are drawn for purposes of general illustration only. FIGS. 4A and 4B demonstrate that the antenna device 10 may generate a gain of at least 4 dBi in 3 dimensions.

Figure 5:
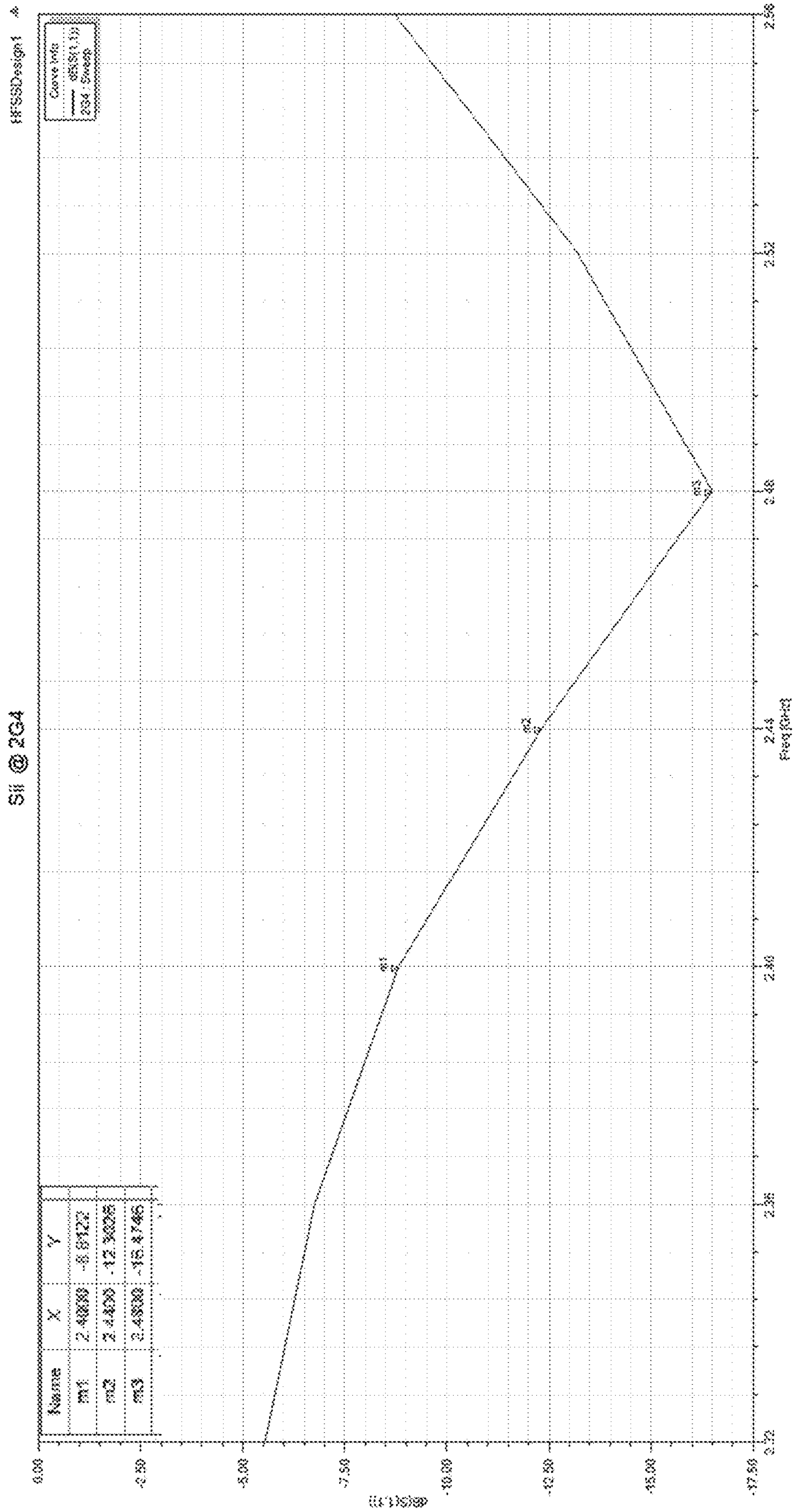
FIG. 5 is a depiction of the impedance matching of the antenna device of FIG. 1 in the omnidirectional state, according to some embodiments of the disclosure.

FIG. 5 depicts the impedance matching of the antenna device 10 in the omnidirectional state. In electronics, impedance matching is the practice of designing the input impedance of an electrical load or the output impedance of its corresponding signal source to maximize the power transfer or minimize signal reflection from the load. In FIG. 5, the matching is illustrated for S11 for frequencies in the 2.4 GHz band. As is known to those of skill in the art, S11 is a measure of antenna efficiency that represents how much power is reflected from the antenna. This measure is known as the reflection coefficient or the return loss. For example, if S11 is 0 dBi, then all the power is reflected from the antenna, and none is radiated. If S11 is less than 0 dBi, it is an indication that a portion of the power is radiated from the antenna. The more that S11 is negative, the less the amount of power that is reflected from the antenna, and the more power is radiated from the antenna.

As seen in FIG. 5, at 2.40 GHz, the return loss, or matching (indicated on the Y-axis) is −8.8122 decibels; at 2.44 GHz, the matching is −12.3026 decibels, and at 2.48 GHz, the matching is −16.4746 decibels. Furthermore, as can be seen from the plot, the measured dBi is less negative at frequencies lower than 2.40 GHz or higher than 2.48 GHz. Thus, each dipole antenna 14 transmits most effectively (i.e., absorbs the least amount of power, and radiates best) at 2.48 GHz.

Figure 6:
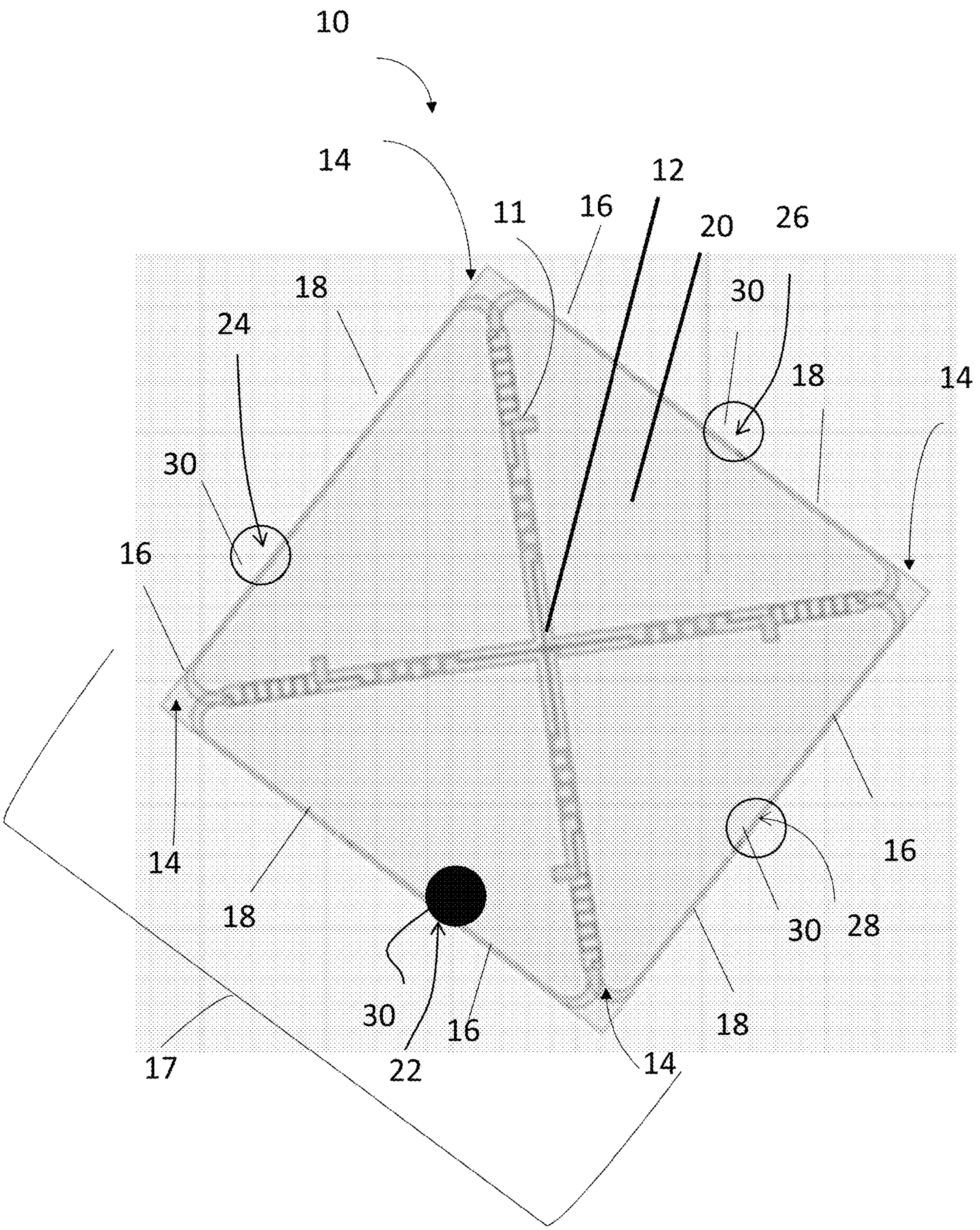
FIG. 6 is a depiction of the antenna device of FIG. 1 in a directional state, according to some embodiments of the disclosure.

Attention is now directed to FIGS. 6-10, which illustrate the antenna device 10 in a directional state. FIG. 6 illustrates the antenna device 10, which is identical to the antenna device 10 as depicted in FIG. 1, with the following exception: whereas in FIG. 1, each of the switches 30 associated with junction points 22, 24, 26, 28 was "off," in FIG. 6, the switch 30 associated with junction point 22 is "on," and thus depicted as a filled circle, while the other switches 30 are off, and thus depicted as an open circle.

The effect of turning on the switch 30 at junction point 22 is to combine two adjacent dipole antennas 14 into a single long radiating element, or dipole antenna, 17 having two feeding points. The combined dipole antenna 17 thus extends from junction point 24, through junction point 22, which is now closed, and to junction point 28. The other two dipole antennas remain as they were originally, each with ends 16, 18. The two combined dipole antennas 14 thus function as a single dipole antenna. The result of combining the two dipole antennas 14 is to change the current distribution on these dipole antennas. Specifically, the energy in the combined dipole antenna 17 is lower compared to the energy in the separate dipole antennas 14. This increases the directional gain in the direction directly opposite the combined dipole antenna 17, relative to the directions in which the dipole antennas 14 are combined.

Notably, the use of switch 30 enables the antenna device 10 to be switched between a directional state and an omnidirectional state without the use of passive elements or devices. Rather, the mechanism of the mode switching is based on coupling of multiple dipole antennas 14 to each other.

Figure 7:
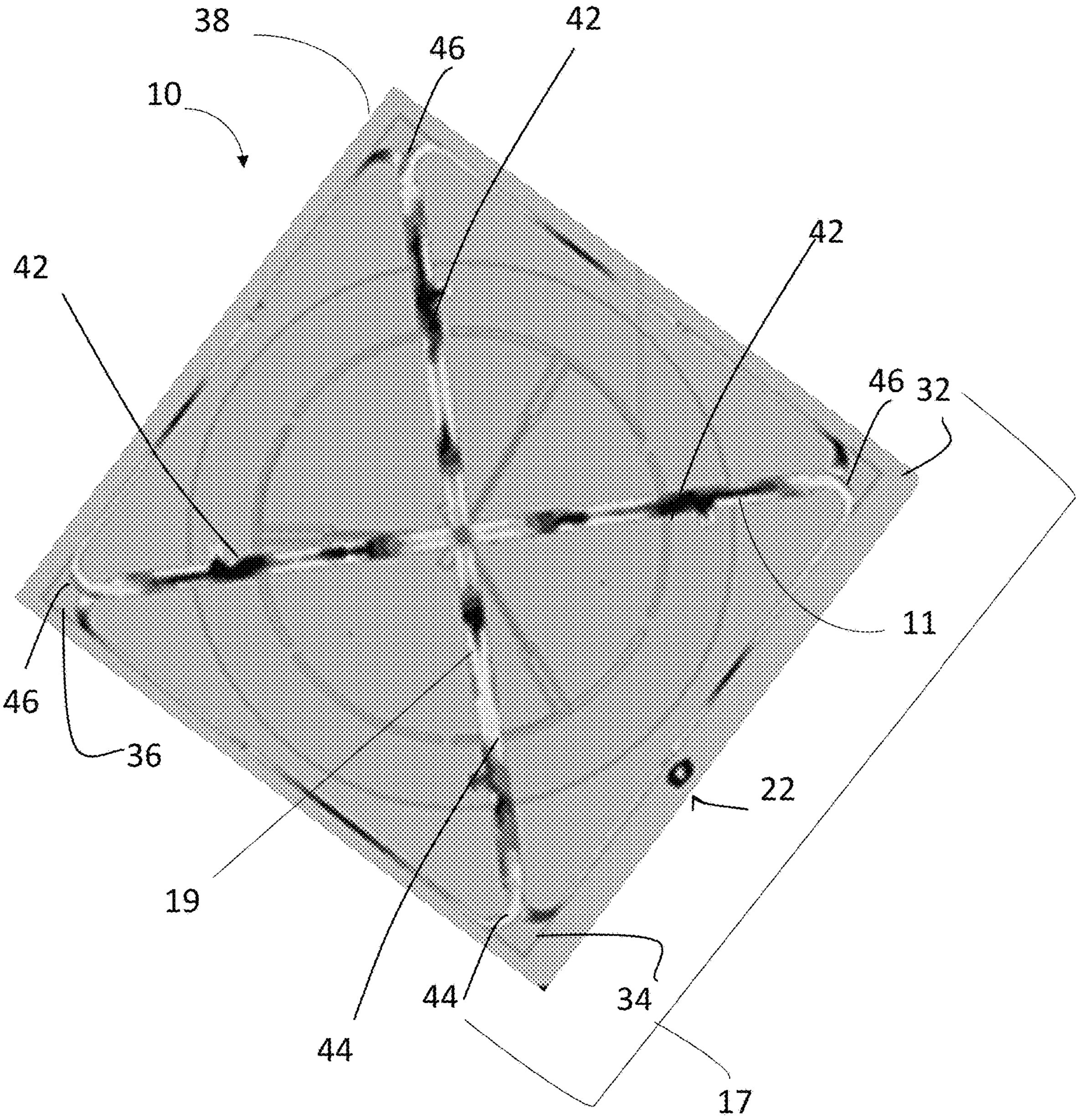
FIG. 7 is a depiction of the near electric field generated by the antenna device of FIG. 6 in the directional state, according to some embodiments of the disclosure.

FIG. 7 depicts an electric field that is generated along each dipole antenna 14 and the combined dipole antenna 17, when the antenna device 10 is in the directional state. The strength of the electric field is measured in Volts per meter (V/m). The strength of the electric field is divided into the same four regions 40, 42, 44, 46 as in FIG. 2. As described above in connection with FIG. 2, it is to be recognized that the variations in electric field across antenna device 10 are continuous, rather than discrete, and the approximations of electric field for each particular region are for purposes of general explanation only.

As can be seen in FIG. 7, and in contrast to the electric field of FIG. 2, in the directional mode, the electric field is not symmetric around the entire antenna device 10. For example, corners 32, 36, and 38 each include a high energy region 46, as they did in the omnidirectional mode. However, corner 34 does not have an equivalent high energy region 46. Rather, the maximum energy achieved in corner 34 is in middle energy region 44. Similarly, further toward the port along each of the feeding arms 11, the feeding arm 19 leading to corner 34 has a section with energy region 44, whereas the equivalent areas on the other feeding arms 11 have an electric field within energy region 42.

Figure 8:
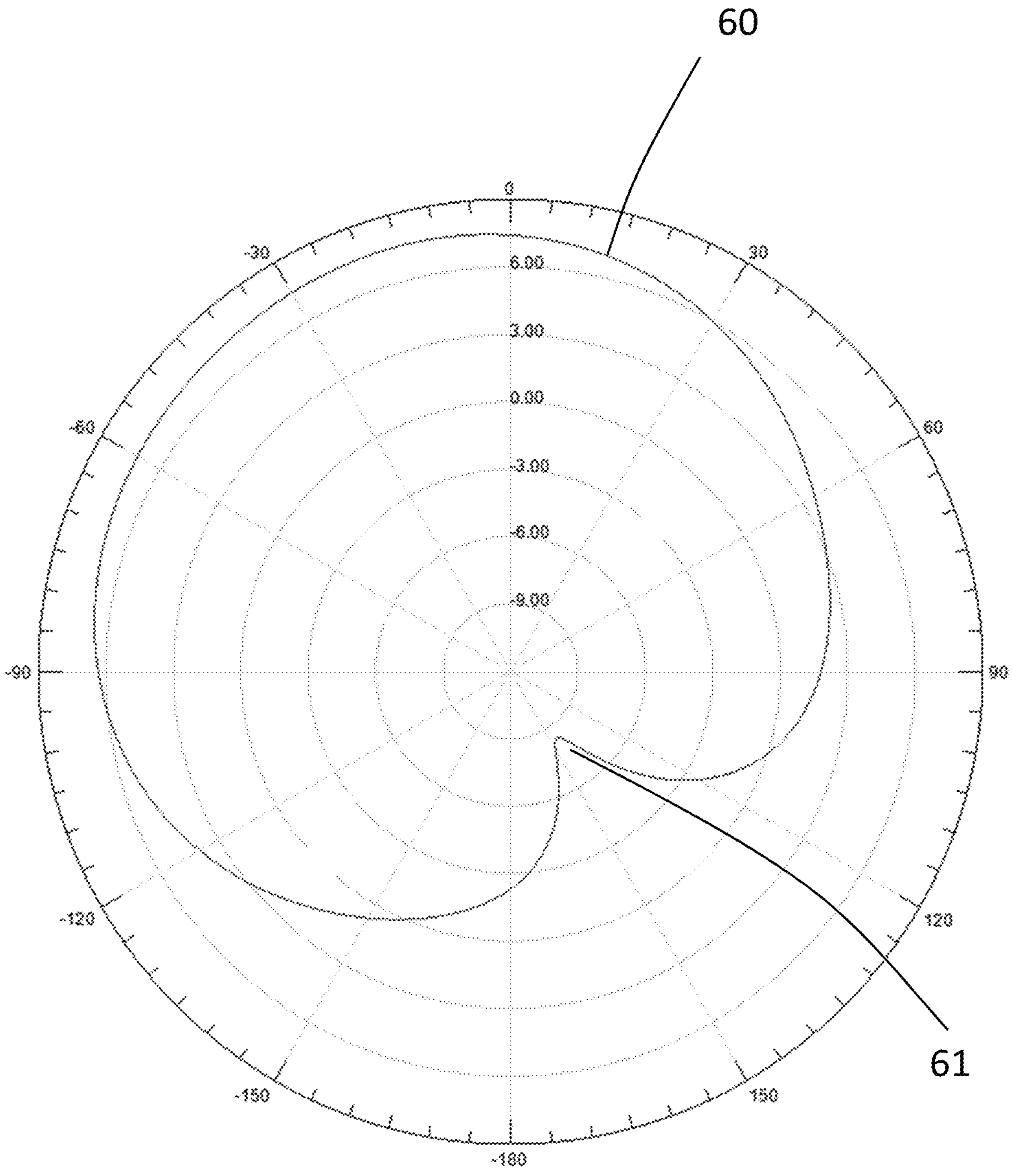
FIG. 8 is a depiction of the far electric field generated by the antenna device of FIG. 6 in the directional state, taken in the azimuthal plane at θ=135°, according to some embodiments of the disclosure.

FIG. 8 depicts the far electric field generated by antenna device 10 in the directional state. Far electric field 60 is measured in dBi as the azimuthal plane pattern, at frequency of 2.45 GHz, with theta at 135°. As can be seen, far electric field 60 exceeds 6 dBi between the angles of −90° and 30°. At angles lower than −90° and higher than 30°, the electric field 60 is lower than 6 dBi, and, at indentation 61, it descends to nearly −9 dBi at 150°. The reason that the far electric field 60 has a non-symmetrical profile is because of the asymmetry in the near electric field shown in FIG. 7. The asymmetrical near electric field over the dipoles produces strong directivity in the far electric field, in the direction opposite combined antenna 17.

Figure 9A:
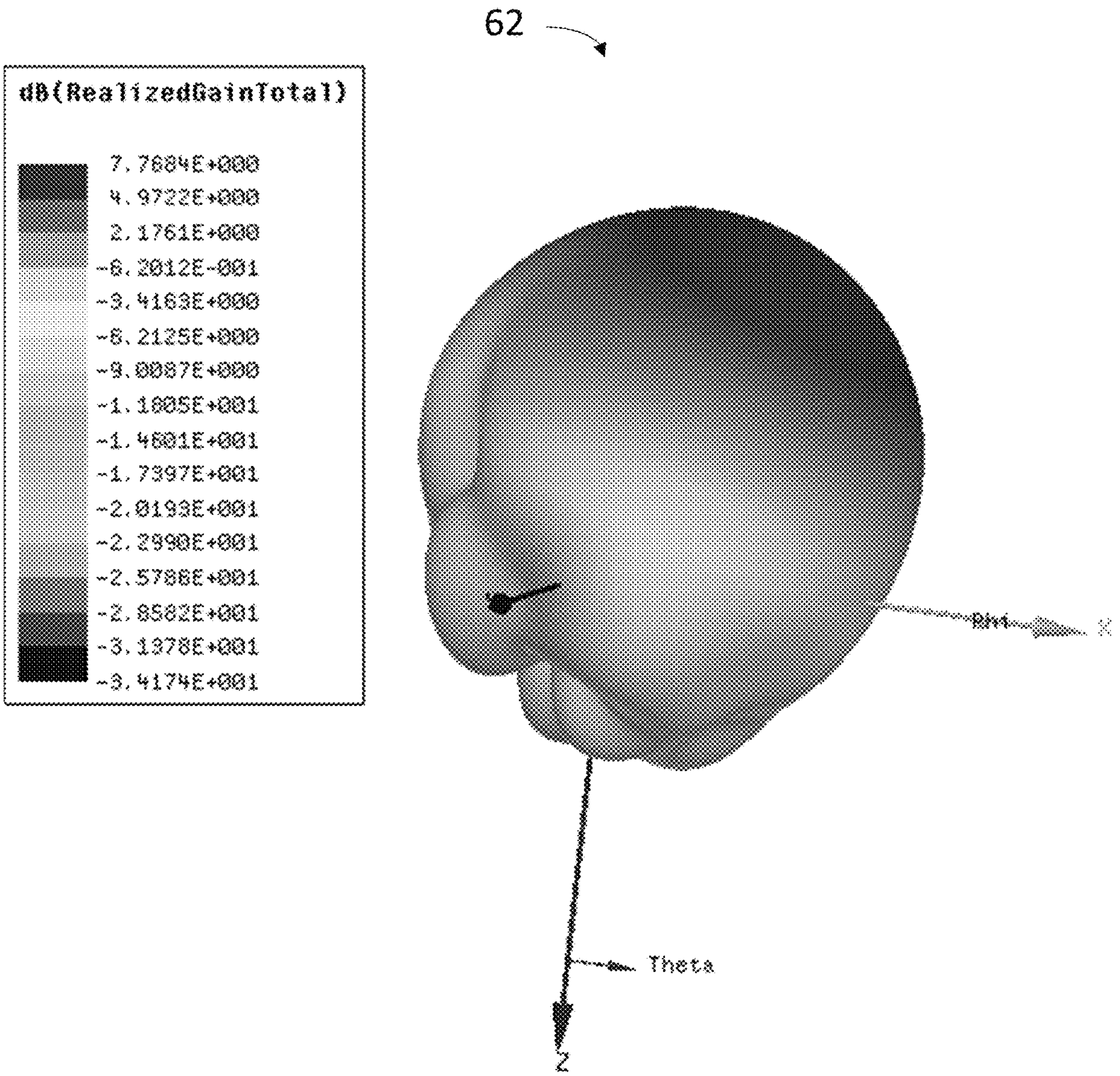
FIGS. 9A and 9B are depictions of the realized gain in total of the antenna device of FIG. 6 in the directional state, measured spherically around the antenna device, according to some embodiments of the disclosure.
Figure 9B:
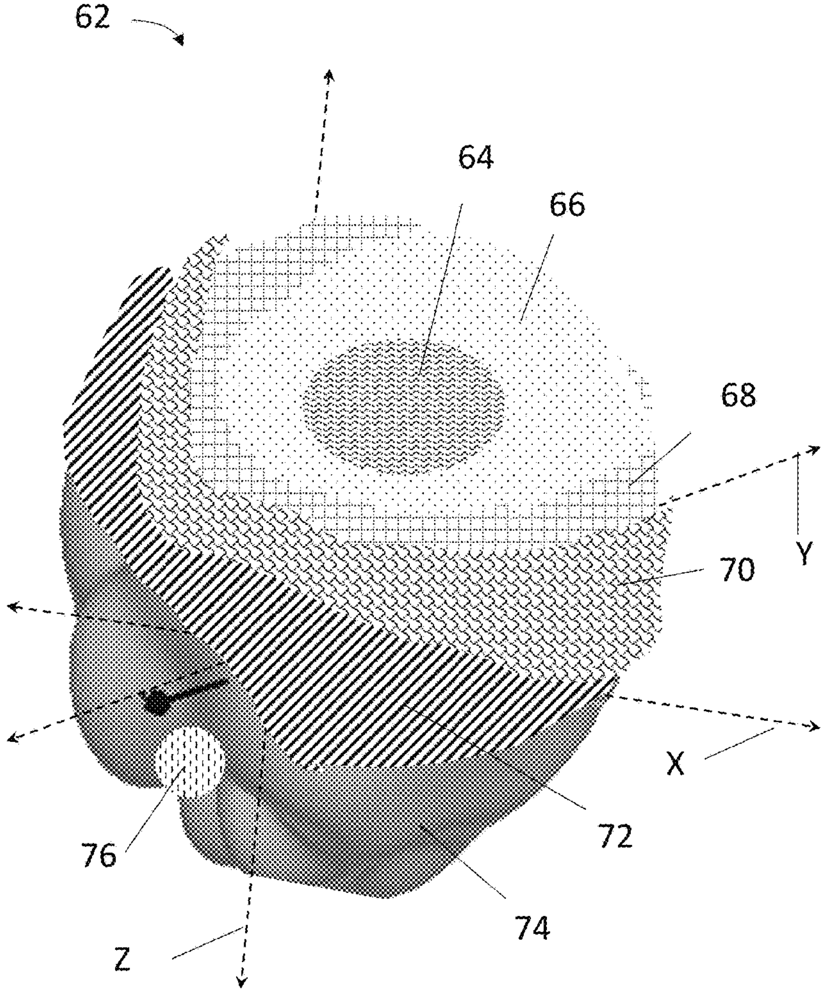

FIGS. 9A and 9B depict the gain 62 generated by the antenna device in the directional state. FIG. 9A illustrates the shape of the gain 62 profile in three dimensions, and FIG. 9B depicts the values of the gain 62 for various regions in the 3 dimensional profile, expressed in dBi. As can be seen in FIGS. 9A and 9B, in the directional state, areas of high gain 64, 66 assume an approximately hemispherical profile. The areas of low gain, such as area 74, assume a less regular profile, corresponding to the indentation 61 in the curve of electric field 60.

As seen in FIG. 9B, the realized gain is strongly directional. In region 64, the realized gain is between 4.9722 to 7.768 dBi; in region 66, the realized gain is 2.1761 to 4.9722 dBi; in region 68, the realized gain is −0.62012 to 2.1761 dBi, in region 70 the realized gain is −3.4163 to −0.62012 dBi, in region 72 the realized gain is −9.0087 dBi to −6.2125 dBi, in region 74 the realized gain is −17.397 to 9-0.0087 dBi, and in region 76 the realized gain is −20.193 to −17.397 dBi.

As can be seen from a comparison of the realized gain in FIGS. 8, 9A and 9B versus FIGS. 3, 4A and 4B, the maximum gain in the directional state is more than 3 dBi greater than the maximum gain in the omnidirectional state. For example, the maximum gain in region 64 of FIG. 9B is 7.768 dBi, whereas the maximum gain in region 52 of FIG. 4B is 4.3790 dBi. Thus, the directional state provides a significantly higher gain in the desired direction, compared to the gain in that direction in the omnidirectional state.

Figure 10:
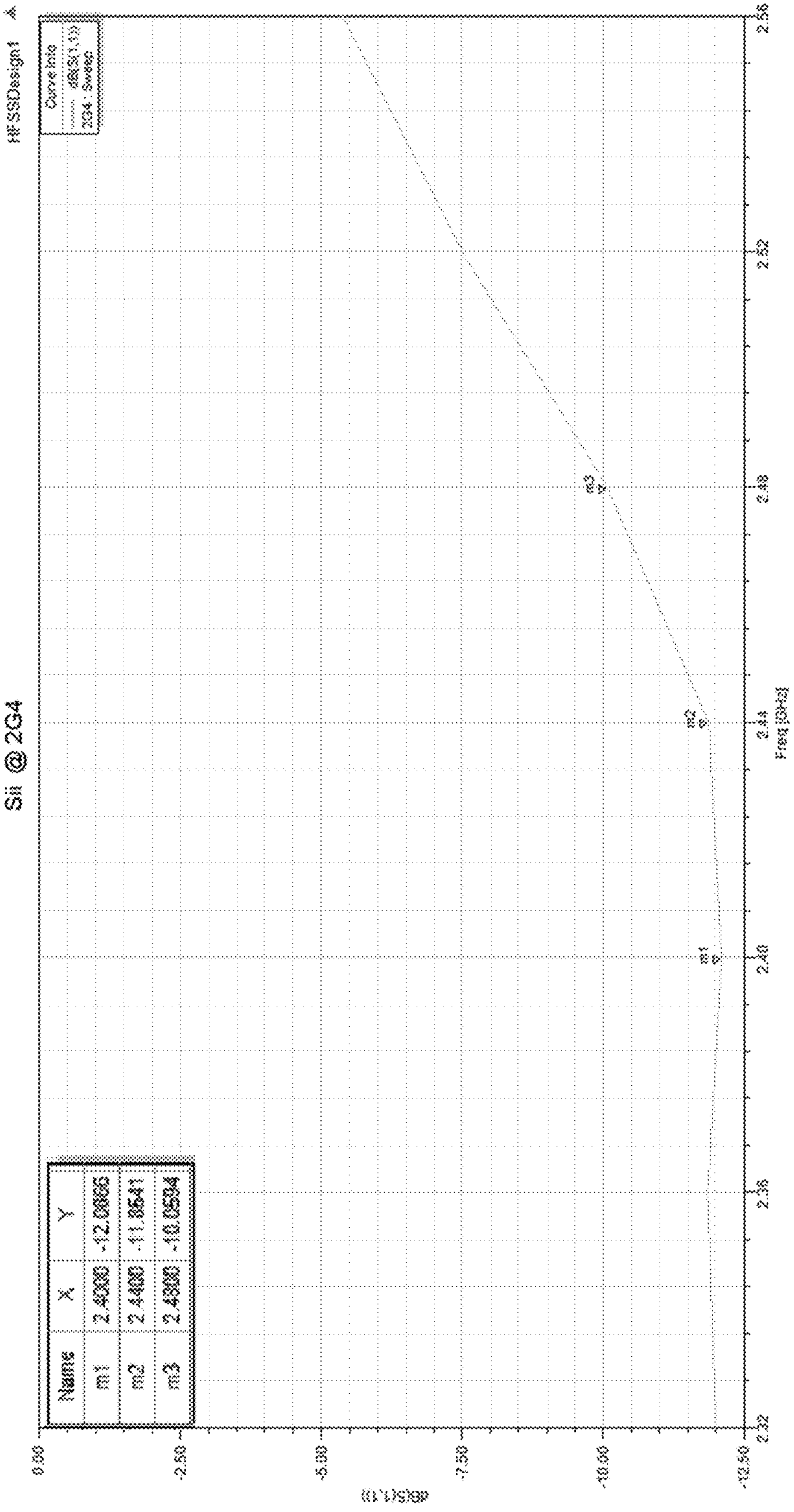
FIG. 10 is a depiction of the impedance matching of the antenna device of FIG. 6 in the directional state, according to some embodiments of the disclosure.

FIG. 10 depicts the impedance matching of the antenna device 10 in the directional state. In FIG. 10, the matching is illustrated for S11 at a frequency of around 2.4 GHz. As seen in FIG. 10, at 2.40 GHz, the matching (indicated on the Y-axis) is −12.0866 decibels; at 2.44 GHz, the matching is −11.8541 decibels, and at 2.48 GHz, the matching is −10.0594 decibels. A comparison of FIG. 10 and FIG. 5 shows that the frequency which results in the lowest return loss for the measured antenna device 10, in both the omnidirectional and directional states, is 2.44 GHz.

The ability of the antenna device 10 to obtain effective matching at two different frequencies is a result of the asymmetry between arms 14, 16. One of the main problems in design of smart antennas is matching. In the described embodiment, there is an array of four dipole antennas 14 on a single feeding network. Usually, with careful design of dipoles and their feeding network, one can get good matching for a single state, e.g., the omnidirectional state of the depicted embodiment. But, in the depicted embodiment, it is necessary to design a single feeding network that provides good matching in two states, omnidirectional and directional. This is achievable through the use of dipole antennas 14 with asymmetric arms, 16, 18. Given the comparatively narrow bandwidth of the 2.4 GHz band, it is possible to determine a precise degree of asymmetry of the dipoles 16, 18 that enables matching the structure in both the omnidirectional and directional states. In one embodiment, this degree of asymmetry is approximately 0.4:0.6.

Antenna device 10 is particularly beneficial for transmission at 2.4 GHz, compared to transmission at 2.4 GHz using other devices that incorporate passive elements. This is because, usually, passive elements of a 2.4 GHz antenna device resonate at 5 GHz, causing strong coupling between all elements. This problem is intensified since modern access points provide high throughput by using massive MIMO (multiple input, multiple output) techniques, and which may have other antennas designed to transmit at 5 GHz. Therefore for modern access points, that include large number of antennas (such as 16, 20, 24 or 32), it is beneficial to avoid the use of passive elements, so as to reduce the coupling between elements. The absence of passive elements thus enables gaining strong directional gain, even with 5 GHz elements nearby.

The described antenna device 10 has many other benefits compared to alternative devices. The structure of antenna device 10 has a small form-factor, which enables it to be included in a small size access point. Furthermore, the ability to achieve high gain in the omnidirectional mode enables achieving low error vector magnitude (EVM) with relatively high transmission power (high effective isotropic radiation power (EIRP)). Furthermore, the unique mechanism of the beam diversion in directional mode provides high additional gain. The antenna device 10 may be manufactured very simply, e.g., as a PCB trace antenna, and thus is cost-effective.

Figure 11:
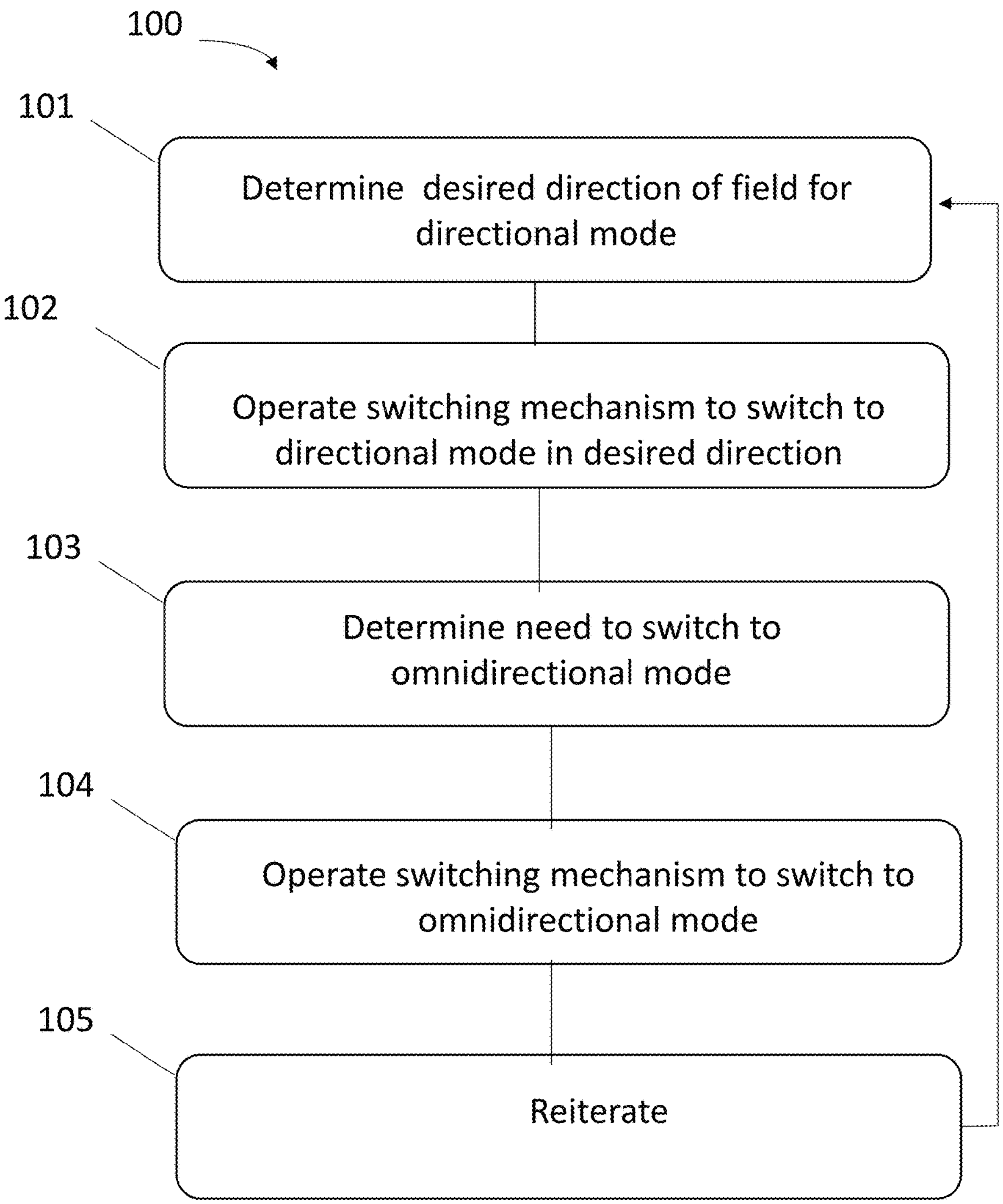
FIG. 11 is a depiction of steps of a method of switching an antenna device from an omnidirectional state to a directional state, according to some embodiments of the disclosure.

FIG. 11 depicts steps of a method 100 of switching an antenna device 10 from an omnidirectional state to a directional state, according to some embodiments of the disclosure. Antenna device 10 includes a plurality of dipole antennas 14 and a port 12, in the manner discussed above. Each of the dipole antennas 14 is connected to the port 12, and the plurality of dipole antennas 14 are arranged around the port 12. Each of the plurality of dipole antennas 14 includes two ends 16, 18, and the ends of the dipole antennas are arranged in a plurality of pairs, each pair comprising one end of one of the dipole antennas and one end of another one of the dipole antennas. The two ends in each pair are arranged in proximity to each other.

The method commences when antenna device 10 is in the omnidirectional state, which may be a default state. At step 101, the device 10 optionally determines a desired direction of field for the directional state. This determination may be based on the detection of one or more mobile devices in the vicinity of antenna device 10, e.g., when the one or more mobile devices are clustered in a particular direction relative to the antenna device 10. The antenna device may be part of a smart antenna that may be toggled back and forth between the omnidirectional and directional states according to the needs of the environment, e.g., the sensing of mobile devices within a given range of the antenna device.

At step 102, one or more switches 30 are operated, to switch antenna device 10 from the omnidirectional state to the directional state, so that the device 10 will generate a directional field in the desired direction. The operating step 102 includes switching the switches between an omnidirectional state, in which the ends of the dipole antennas 14 are not connected to each other; and a directional state, in which the two ends in each of one or more of the pairs of ends are connected to each other. More specifically, the operating step 102 includes operating the one or more switches to connect two of ends one or more of the pairs of dipole antennas 14.

The method may accordingly be used to switch an antenna device between the omnidirectional state and directional state without using any passive devices. Rather, the antenna device is switched between the states based on coupling of multiple dipole antennas to each other. This enables providing a high gain omnidirectional pattern in the azimuthal plane, in the omnidirectional state, when the dipole antennas are not connected to each other, put also providing a to a high gain directional pattern in the azimuthal plane, when two ends in each of one or more of the pairs are connected to each other.

At step 103, the method further includes determining when to revert the antenna device back to the omnidirectional state. This determination may be based on the detection of one or more mobile devices in the vicinity of antenna device 10, e.g., at numerous directions around the antenna device 10. At step 104, the method further includes operating the one or more switches, and thereby switching the antenna device back from the directional state to the omnidirectional state. In this implementation, the antenna device 10 is part of a smart antenna that may be toggled back and forth between the omnidirectional and directional states according to the needs of the environment, e.g., the location of mobile devices within a given range of the antenna device 10.

At step 105, the method is reiterated. That is, upon detection of one or more devices in a single direction relative to the antenna device 10, the antenna device 10 may be switched back to the directional state, in the manner described above.

As can be understood by those of skill in the art, each of the measurements for the electric field, gain, and impedance matching of the antenna device 10 discussed above are for one particular embodiment of the antenna device 10. Adjustments in various parameters of the antenna device 10, such as the length of arms 16, 18, the length of feeding arm 11, the orientation of the dipole antennas 14 around the port 12, the structure of the closed shape formed by the dipole antennas 14, the size and location of ground plane 20 relative to the dipole antennas 14, and the energy delivered from power source 15, all influence the electric field, gain, and impedance matching. Accordingly, the values described above should be understood in an exemplary, as opposed to a limiting, sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant dipole antennas will be developed and the scope of the term dipole antenna is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. An antenna device comprising:

a plurality of dipole antennas arranged around and connected to a port, wherein the plurality of dipole antennas is arranged in a plurality of pairs, each pair comprising a first end of one of the plurality of dipole antennas and a second end of another one of the plurality of dipole antennas, the first end and the second end in proximity with each other to form each pair; and one or more switches configured to switch between an omnidirectional state and a directional state, wherein respective ends of the plurality of dipole antennas are not in connection with each other in the omnidirectional state, and wherein ends of each of the one or more of the plurality of pairs are in connection with each other in the directional state.

2. The antenna device of claim 1, wherein, in the directional state, at least two of the plurality of dipole antennas are combined into a single long radiating element having two feeding points.

3. The antenna device of claim 1, wherein each of the plurality of dipole antennas comprises two asymmetric arms.

4. The antenna device of claim 1, wherein the plurality of dipole antennas is arranged around the port in a substantially rectangular or substantially circular orientation.

5. The antenna device of claim 1, wherein the plurality of dipole antennas is arranged horizontally above a ground plane.

6. The antenna device of claim 1, wherein the plurality of dipole antennas comprises at least three dipole antennas.

7. The antenna device of claim 1, wherein, in the omnidirectional state, a gain in an entire azimuth plane is at least 4 dBi.

8. The antenna device of claim 1, wherein a difference in gain between the omnidirectional state and the directional state is at least 3 dB.

9. The antenna device of claim 1, further comprising electronic circuitry for connecting and disconnecting ends of adjacent dipole antennas, and a control algorithm for determining which ends of adjacent dipole antennas to connect in order to steer an antenna beam of the antenna device in a directional state towards a location of one or more mobile devices.

10. The antenna device of claim 1, wherein the one or more switches comprise at least one of a diode, a transistor, and an electronic switch.

11. A method for switching an antenna device between an omnidirectional state and a directional state, the method comprising:

connecting, with one or more switches, two ends in each of one or more arranged pairs of a plurality of dipole antennas to operate in the directional state, the plurality of dipole antennas arranged around and connected to a port, wherein each pair comprises a first end of one of the plurality of dipole antennas and a second end of another one of the plurality of dipole antennas, the first end and the second end in proximity with each other to form each pair; and disconnecting, with the one or more switches, the two ends in each of the one or more arranged pairs of the plurality of dipole antennas to operate in the omnidirectional state.

12. The method of claim 11, further comprising connecting at least a pair of adjacent dipole antennas into a single long radiating element having two feeding points.

13. The method of claim 11, further comprising increasing a gain between the omnidirectional state and the directional state in at least one direction by at least 3 dB.

14. The method of claim 11, further comprising determining which direction to steer an antenna beam of the antenna device towards a location of one or more mobile devices.

15. The method of claim 11, further comprising determining when to revert the antenna device back to the omnidirectional state, and operating the one or more switches, and thereby switching the antenna device back from the directional state to the omnidirectional state.

16. A method for configuring an antenna device, the method comprising:

determining, in a directional mode of the antenna device, a desired direction of field, wherein the antenna device comprises a plurality of dipole antennas arranged in a plurality of pairs, each pair comprising a first end of one of the plurality of dipole antennas and a second end of another one of the plurality of dipole antennas, the first end and the second end in proximity with each other to form each pair, and wherein ends of each of the one or more of the plurality of pairs are in connection with each other in the directional mode; and operating a switching mechanism to switch to the directional mode in the desired direction, wherein the switching mechanism comprises one or more switches to connect or disconnect ends of the plurality of dipole antennas in the plurality of pairs.

17. The method of claim 16, further comprising:

determining a need to switch the antenna device into an omnidirectional mode, wherein respective ends of the plurality of dipole antennas are not in connection with each other in the omnidirectional mode; and operating the switching mechanism to switch to the omnidirectional mode.

18. The method of claim 17, wherein operating the switching mechanism to switch to the omnidirectional mode comprises disconnecting the respective ends of the plurality of dipole antennas in the plurality of pairs.

19. The method of claim 18, further comprising:

detecting an update for the desired direction or an update of the need for the omnidirectional mode; and operating the switching mechanism to switch to the directional mode or the omnidirectional mode based on the update for the desired direction or the update for the need for the omnidirectional mode.

* * * * *